United States Patent [19]

Hansen

[11] Patent Number: 4,560,840
[45] Date of Patent: Dec. 24, 1985

[54] DIGITAL HANDSFREE TELEPHONE

[75] Inventor: Bjorn N. Hansen, Haverhill, England

[73] Assignee: International Standard Electric Corporation, New York, N.Y.

[21] Appl. No.: 584,579

[22] Filed: Feb. 29, 1984

[30] Foreign Application Priority Data

Mar. 1, 1983 [GB] United Kingdom ................ 8305572

[51] Int. Cl.⁴ ............................................. H04M 1/60
[52] U.S. Cl. ................................ 179/81 B; 179/100 L
[58] Field of Search ............... 179/81 B, 100 L, 81 R, 179/170.2, 170.6

[56] References Cited

U.S. PATENT DOCUMENTS 3,970,786  7/1976  Randmere .......................... 179/81 B
4,465,902  8/1984  Zato .............................. 179/100 L X

*Primary Examiner*—James L. Dwyer
*Attorney, Agent, or Firm*—John T. O'Halloran; Jeffrey P. Morris

[57] ABSTRACT

In a loudspeaking telephone arrangement, there are separate channels for outgoing speech (A-Tx) and incoming speech (A-Rx), and the channels are sampled at intervals. The results of these samplings, which represent the amplitudes of the speech in those channels are each compared by a microprocessor with a preset threshold. The background noise level is also sampled and the result used to adjust the speech channel threshold. Each channel has an attenuator, and that is adjusted so that attenuation is reduced in the presence of speech and increased in the absence thereof. The adjustment on the basis of background noise enables the current state of the channels to be taken into account.

2 Claims, 10 Drawing Figures

DIGITAL HANDSFREE TELEPHONE

This invention relates to a telephone subscriber's instrument with a handsfree facility.

A handsfree telephone receives speech via a loudspeaker built into the set and sends speech via a microphone on the set and near the speaker. The two transducers can also be incorporated into a separate unit near the telephone, or the microphone may be separate from the speaker unit, connected thereto by a cord or by a cordless transmission system. This closeness of the speaker and microphone may cause instability due to analogue coupling from loudspeaker to microphone, with electrical coupling within the transmission circuit including far-end acoustic coupling. In a digital system coupling between the digital transmission paths is not relevant, which leaves coupling due to analogue signals at both ends of the connection, i.e. sidetone and acoustic coupling. The system is unstable when these factors create a closed loop gain greater than unity.

To get adequate speech levels from the speaker and adequate microphone sensitivity, the signal gain in the speech paths has to be controlled so that total loop gain is always less than unity. To do this, the incoming speech path is attenuated while outgoing speech is present, and vice versa under control of a speech amplitude detection system. The invention has as its object the provision of an arrangement for achieving this in a satisfactory and economical manner.

According to the invention, there is provided an electrical circuit arrangement for use in a loudspeaking telephone, wherein there are separate channels for outgoing speech and for incoming speech, wherein each said channel is sampled at preset intervals and the results of the samplings, which represent the amplitudes of the speech (if any) in those channels, are each compared with a preset threshold amplitude, wherein the level of the background noise in the channels is monitored and the threshold amplitude for each said channel is adjusted so as to be at least equal to the noise level as monitored, and wherein each said channel includes an attenuator whose value is adjusted according to the results of the comparisons, each said speech channel being enabled or disabled according to the comparison results, so that a channel on which the current threshold amplitude has been exceeded is enabled while a channel in which the current threshold amplitude has not been exceeded is disabled.

Thus the above arrangement involves for each speech channel the detection of the speech signal and its comparison with a preset threshold. When such a threshold is achieved there is an initial delay before the speech channel is enabled, which delay should be as short as possible to avoid clipping the beginning of the speech. At the end of the speech, when its amplitude falls below the threshold a delay should be introduced to avoid clipping and to avoid unnecessary inter-word switching. The noise level detection is needed because the speech signals often have to be detected in the presence of noise. In the arrangement to be described herein, which is a digital system, the three main parameters of a voice switching system, i.e. initial delay, threshold level and hold-on time are determined using a processor-controlled system which operates on digitally encoded speech samples.

An embodiment of the invention will now be described with reference to the accompanying drawings, in which FIG. 1 is a highly simplified block diagram of a digital hands-free telephone.

Figure 1:
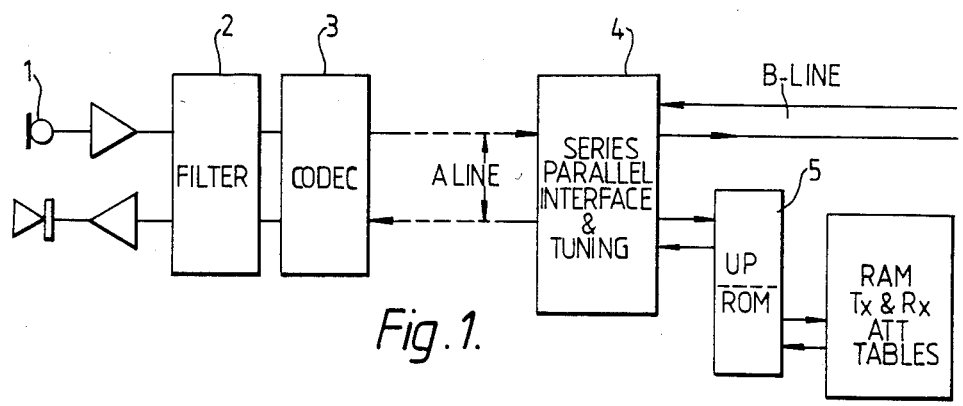

We refer to the block diagram of FIG. 1. The system described herein uses A-law PCM encoded speech signals although the method is applicable when other forms of digitally encoded speech are used.

Figure 2:
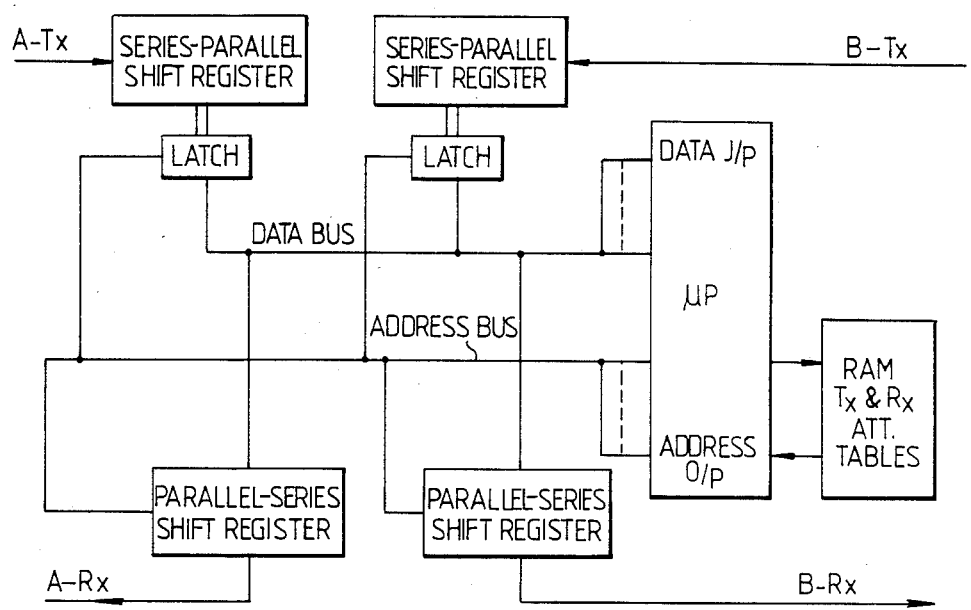
FIG. 2 shows how the PCM encoded speech samples are handled under control of a microprocessor.

The analogue signal from the microphone 1 is amplified and then band-width limited by the codec filter 2. The codec 3 then samples the analogue signal and carries out PCM encoding of the sampled signal amplitudes, which are transmitted to the interface circuit 4 where they are converted to a format suitable for reception by the data processor 5. They are then latched in temporary registers until required by the processor. At the same time PCM codes from the B-line are received and latched. After processing by the computer the codes are re-transmitted to their respective destinations via a pair of registers. The principle is shown in FIG. 2.

The interface also includes the timing circuitry needed to generate the required clock and synchronisation signals for the codec. A signal derived from this circuit is used to interrept the data processor at the same rate as the sampling, PCM codes being read in, processed, and re-transmitted at each such interrupt time.

Figure 3:
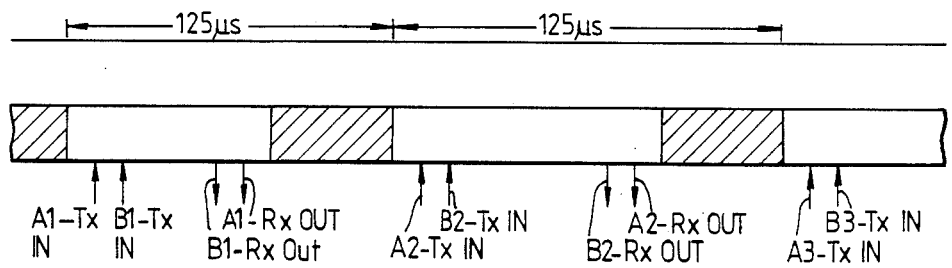
FIG. 3 is a time diagram representative of PCM code processing during programme execution.

The program flow is illustrated in FIG. 3. During execution of the interrupt routine, signal amplitude information from the two directions is converted to an approximation of the respective speech envelope, and the resulting parameter for each direction is passed to the main program. A noise monitor algorithm is also placed within this routine. During execution of the main program each speech envelope parameter is compared with a set threshold and the appropriate speech channel is enabled or partially disabled by adjustments made to two attenuation tables, one in the send speech channel and one in the receive channel. The software used to control the processor is now described.

Figure 4:
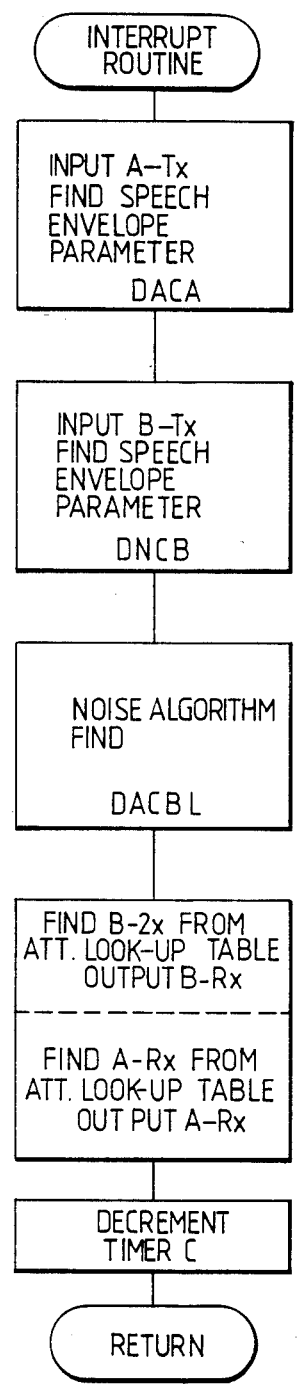
FIGS. 4–10 are flow sheets explanatory of the operation of the telephone described herein.

The flow diagram for the interrupt routine shown in FIG. 4 contains three algorithms, which determine speech envelope parameters in receive and transmit directions and a noise monitor.

Figure 5:
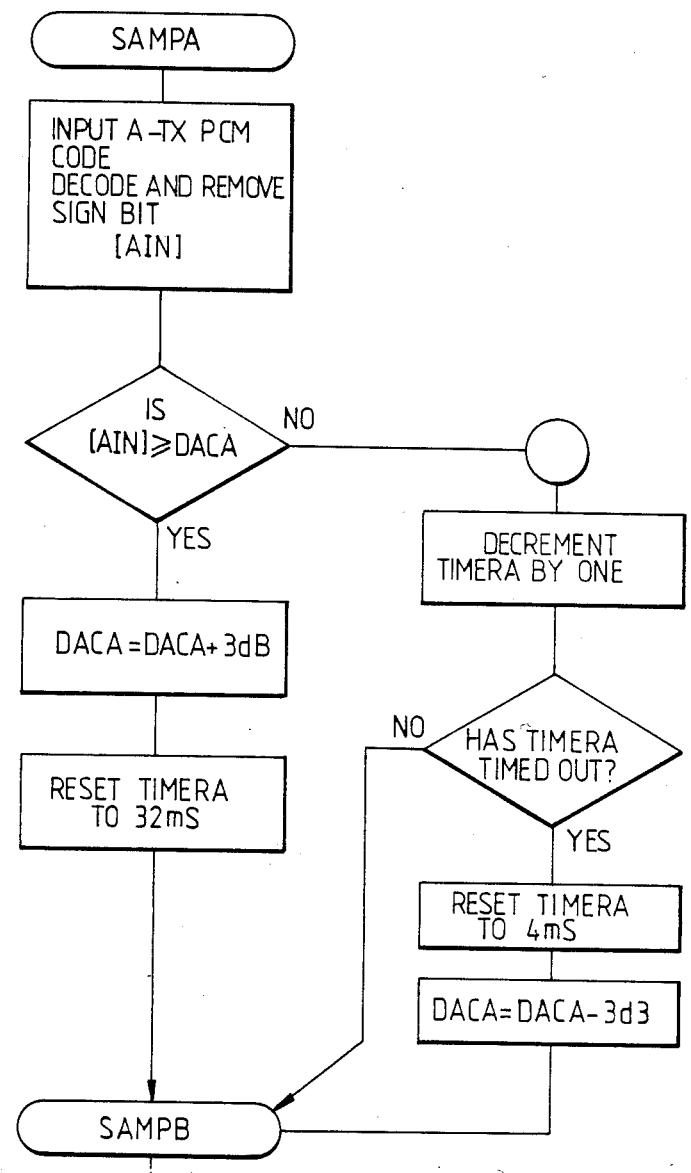

The speech envelope is continuously monitored in both speech directions and is derived from a peak-seeking algorithm at the beginning of the interrupt routine. The output from this algorithm is a parameter representing the sampled speech envelope. A flow diagram of the algorithm is shown in FIG. 5.

The parameter DACA which represents the amplitude of speech envelope, is reset to 0 when the program is originally initialised. It is then incremented in steps of 3 dB every 125 us, or at the sampling rate, until a peak is found. A 32 ms delay is then initiated at the peak level, after which DACA is decremented in steps of 3 dB every 4 ms. Both the 32 ms and 4 ms delays may be reset, and the parameter DACA may be updated if it is found that (AIN)>DACA. "(AIN)" is the value (unsigned) of the decoded Tx PCM code. A corresponding peak-seeking algorithm is applied to the receive path from which parameter DACB is derived. Both of these speech envelope parameters DACA and DACB are passed on to the main program.

Reverting to the interrupt routine, both decoded PCM words must now be re-transmitted to their respective destinations i.e. A-Tx to B-Rx and B-Tx to A-Rx, see the diagram of the interrupt routine, FIG. 4.

The returned codes are found from two attenuation look-up tables. Each decoded and unsigned PCM-word corresponds to an address in the look-up table, i.e. (AIN)=1010111 is the address 57 H. At this address we find the corresponding attenuated code, i.e. with 6 dB attenuation (AIN)-6 dB=1000111=47H. The orginal sign of this word is then replaced, i.e. if negative 11000111=C7H, and it is then encoded into PCM A-law format by inverting alternate digits and sent out to its appropriate destination. This method can also be used for μ-law PCM, but the look-up tables from which the attenuators are controlled are different.

Figure 6:
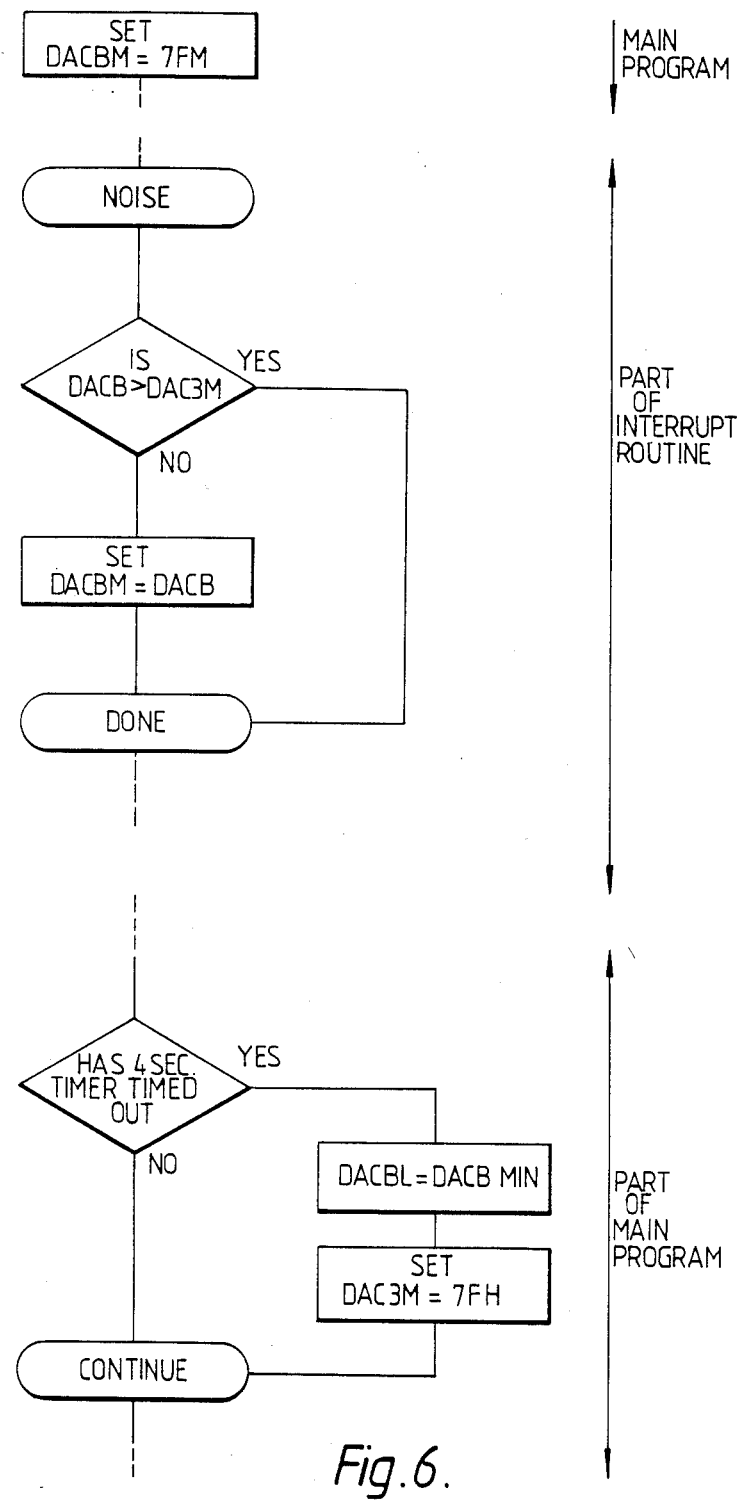

The interrupt routine includes a "noise monitor algorithm" which is time controlled from the main program, its flow diagram being shown in FIG. 6. The noise level is monitored from the microphone input of the handsfree telephone, the "noise" level being defined as the minimum value of the transmit speech envelope over a given period of time. The noise monitor algorithm resets a noise parameter DACBM to maximum code amplitude i.e. 7FH at the beginning of every 4 sec. period. This parameter DACBM is then compared with DACB every 125 us, and reduced to DACB resulting in a figure at the end of the 4 sec. period of DACBM=DACB min. over the period. This is then set to the noise parameter DACBL which is used to control transmit threshold level and channel attenuations. DACBL remains constant over every 4 sec. period and is DACBL-=DACB min. monitored over the previous period.

Figure 7:
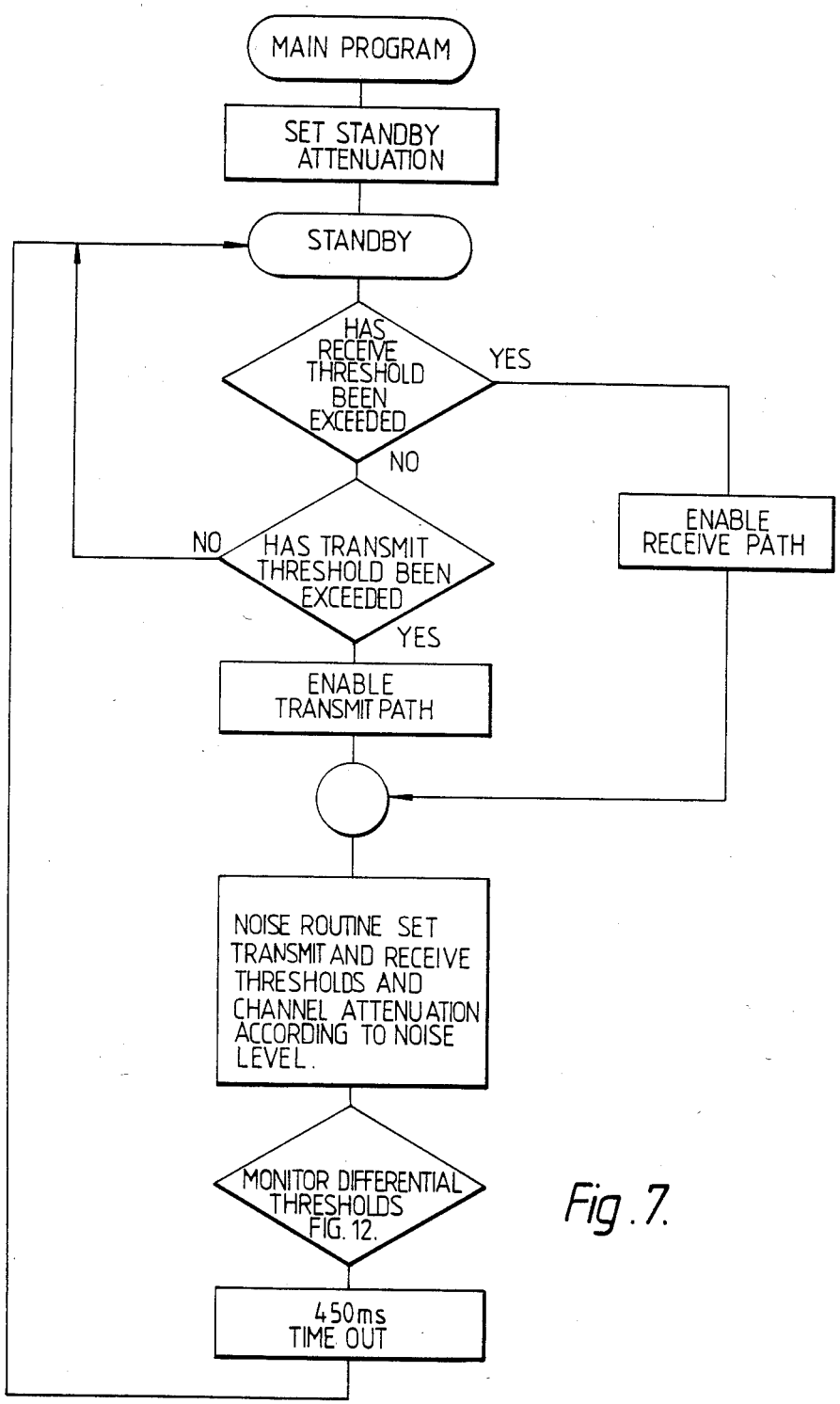
Figure 8:
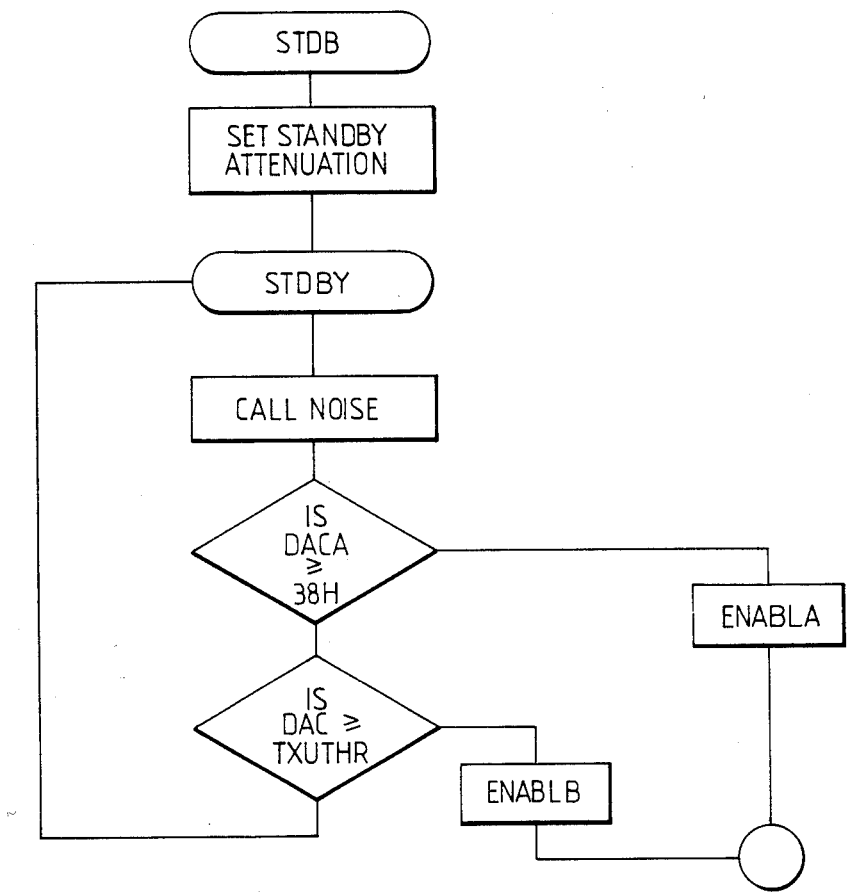

In the main program the two speech envelope levels are compared with the respective thresholds as shown on the flow diagram, FIGS. 7 and 8 of these, FIG. 7 is an outline of the main program while FIG. 8 relates to a comparison of speech envelope levels DACA and DACB each against thresholds, of which RxUTHR is the receive threshold and TxUTHR is the transmit threshold.

Initially the two attenuation tables, i.e. the attenuators in the two speech channels, are given equal attenuation so that the telephone is in a standby state with both transmit and receive channels partially blocked. While executing the standby loop the program first compares DACA with the receive threshold, and if it exceeds this threshold, program execution continues by enabling the A-Tx channel so that the A-party is talking and the B-party (handsfree) is listening. If DACA is found to be less than this threshold, then DACB is compared with the transmit threshold. These threshold levels are variable and depend on the noise level and loudspeaker gain as explained below. As before, if DACB exceeds this threshold then B-Tx channel is enabled so that the B-party is talking and the A-party is listening. If neither threshold is exceeded the program remains in the standby loop.

Figure 9:
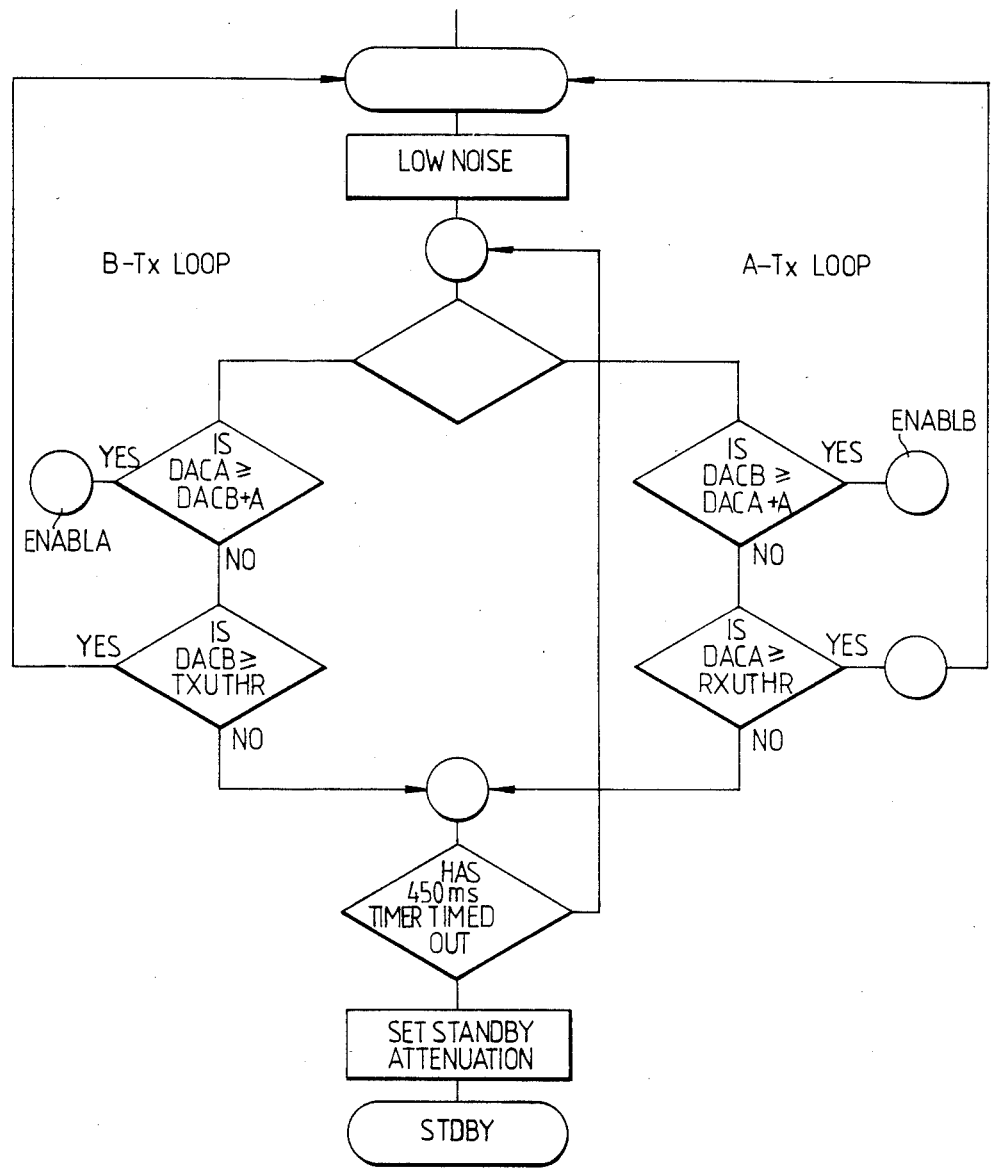

When the channel B-Tx threshold is exceeded the attenuation tables are adjusted so that the B-Tx attenuation is reduced by x dB and A-Tx attenuator is increased by x dB, where x is related to the system configuration, i.e. microphone sensitivity, pre-amp gain and standby attenuation level and can be typically 6 dB or 12 dB. This also allows for some automatic adjustment of path gain to compensate for background noise. This adjustment is carried out by adjusting all 128 codes in each table in sequence from highest amplitude to lowest. The 128 codes are the 128 amplitude levels of the de-coded unsigned PCM-code, which codes are each a 7-bit word: $2^7=128$ levels. These are the codes which are used by the processor to control the settings of the attenuator in the speech channels. Thus during a transition period between speech in one direction and speech in the other direction, some distortion may occur in the speech pattern due to some PCM code sample being re-transmitted at different attenuation levels. However, the transition is so fast that it is in almost all cases not noticeable subjectively. The flow diagram for the adjustment of the look-up tables is shown in FIG. 9. An alternative approach is to have permanent look-up tables, which for eight levels of attenuation needs 1k byte additional memory, but allows attenuation steps of 3 dB to be implemented with greater accuracy than that achieved by a simple algorithm. The transition phase is also eliminated by this method.

Figure 10:
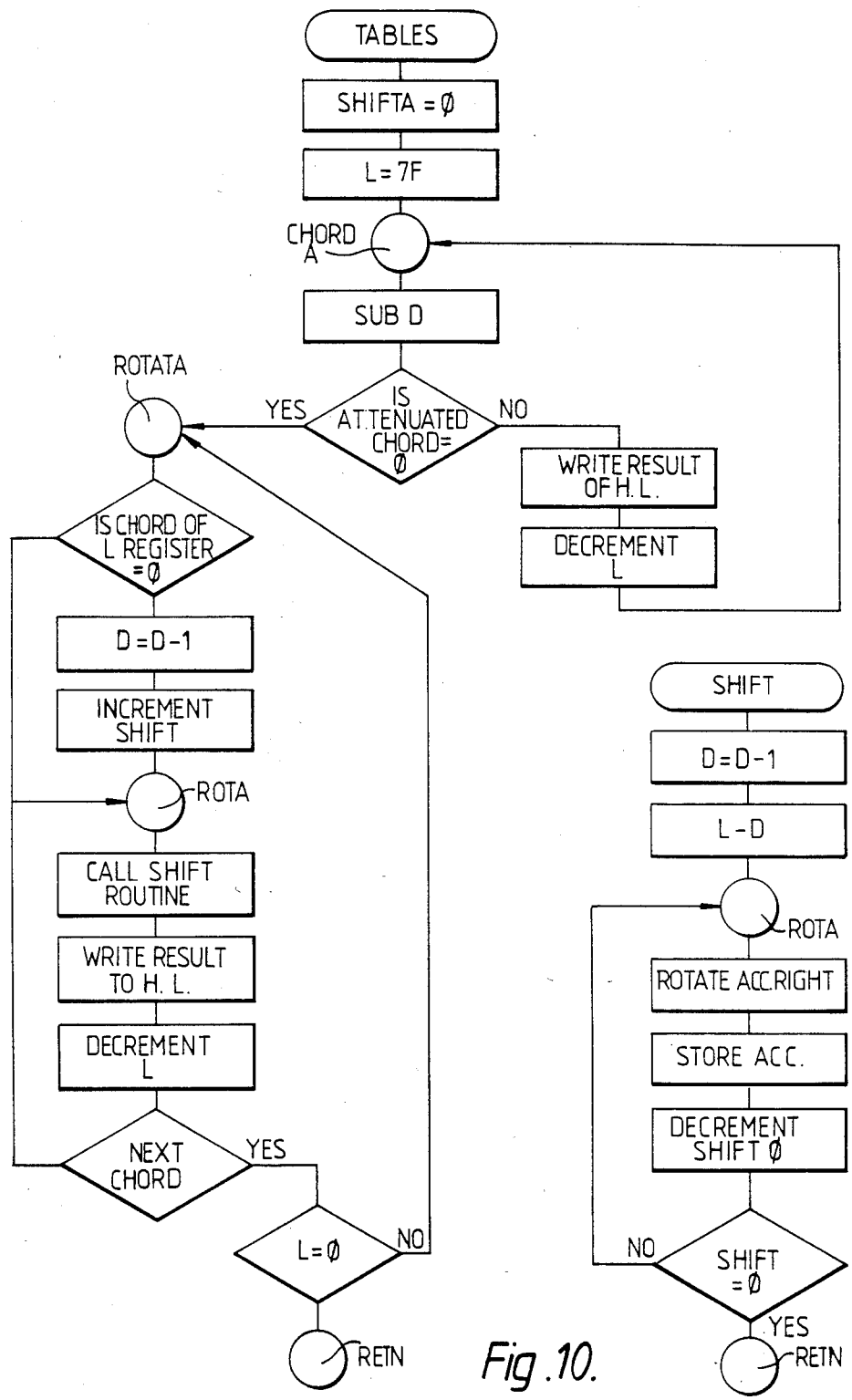

At this stage the program enters a loop which continuously monitors the Bx-Tx or Ax-Tx levels, depending on which channel is open, and compares the results of the monitoring against set thresholds. In the same loop a differential comparison is made of the two speech envelope parameters DACA and DACB. If the B-Tx channel is open, the other channel can at this point gain access in the conversation provided DACA is at a specified level above DACB, i.e. if DACA>DACB+A dB. The differential threshold, A, assumes three different values depending on the loudspeaker gain control setting, the gain control is divided into three ranges, with A=6 dB in the lower range, A=12 dB in the mid range, and A=18 dB within the high range. This automatic adjustment of the differential threshold is introduced to avoid the set switching itself off at relatively high speaker output levels. In such a case, acoustic feedback from the speaker received by the microphone could on detection by the processor exceed its threshold. This would switch the microphone channel on and speaker channel off, whereafter the channels switch back to their original positions as there is no input to the microphone. By setting the differential threshold to an appropriate level as just indicated, this clipping of the speaker output is avoided. This adjustment is illustrated by the flow diagram of FIG. 10.

The flow diagram including differential thresholds and hold-on delay time is shown in FIG. 8. There are basically two loops in the routine. The B-Tx loop holds the outgoing "transmit" channel open until either incoming DACA is >DACB+A or outgoing DACB<TXUTHR. In the latter case, the loop continues until the hold-on time of 450 ms is completed after which the program returns to standby. A similar procedure is carried out in the A-Tx loop when incoming signal channel is on.

I claim:

1. An electrical circuit for use in a handsfree telephone, wherein there are separate channels for outgoing speech and for incoming speech, comprising: Codec means for sampling each said channel at preset intervals and for coupling the results of the samplings, which represent the amplitudes of the speech in those channels, to processor means having an algorithm for comparison of said samplings with a stored threshold amplitude, wherein information representative of the level of the background noise in the channels is monitored and the threshold amplitude for each said channel is adjusted so as to be at least equal to the noise level as monitored, and wherein each said channel includes an attenuator means having a look-up table whose value is adjusted according to the results of the comparisons, such that each said speech channel is enabled or disabled according to the comparison results, and so that a channel on which the current threshold amplitude has been exceeded is enabled while a channel in which the current threshold amplitude has not been exceeded is disabled, and wherein the processor includes a memory having a number of control words each of which when read out is used to control the adjustment of a said look-up table to one of a number of preset values, and wherein when the noise level as monitored is found to have changed a corresponding adjustment is made to the values of said control words.

2. An arrangement as claimed in claim 1, wherein said processor means includes means for measuring the amplitude of a said speech signal by a peak-seeking algorithm in which the speech amplitude is successively compared with a number of amplitude values.

* * * * *